United States Patent [19]

Porat et al.

[11] Patent Number: 4,561,809
[45] Date of Patent: Dec. 31, 1985

[54] CUTTING TOOL INSERT WITH CHIP BREAKER

[75] Inventors: Reuven Porat, Nahariya; Eliezer Nessel, Haifa, both of Israel

[73] Assignee: Iscar Ltd., Nahariya, Israel

[21] Appl. No.: 642,190

[22] Filed: Aug. 20, 1984

Related U.S. Application Data

[63] Continuation of Ser. No. 550,903, Nov. 10, 1983, abandoned, which is a continuation of Ser. No. 205,049, Nov. 7, 1980, abandoned.

[30] Foreign Application Priority Data

Dec. 4, 1979 [IL] Israel .......................................... 58861

[51] Int. Cl.$^4$ ............................................. B26D 1/00
[52] U.S. Cl. ..................................................... 407/114
[58] Field of Search ......................................... 407/114

[56] References Cited

U.S. PATENT DOCUMENTS

| | | | |
|---|---|---|---|
| 3,383,748 | 5/1968 | Galimberti et al. | 407/114 |
| 3,751,782 | 8/1973 | Fruish | 407/114 |
| 3,786,541 | 1/1974 | Lundgren | 407/113 |
| 3,885,281 | 5/1975 | Stambler | 407/114 |
| 3,968,550 | 7/1976 | Gehri | 407/114 |
| 4,116,576 | 9/1978 | Gawryk, Sr. | 407/114 |
| 4,273,480 | 6/1981 | Shirai et al. | 407/114 |

Primary Examiner—Leonidas Vlachos
Attorney, Agent, or Firm—Ladas & Parry

[57] ABSTRACT

A chip breaker arrangement in cutting tool inserts comprising chip breaking grooves that vary in width, depth and/or distance from the cutting edge cyclically, with the variations occurring at either fixed or varying frequencies while the cutting edges are formed in a straight line along the varying chip breaking grooves whereby the same inserts provide effective chip control over a wide range of cutting conditions.

3 Claims, 10 Drawing Figures

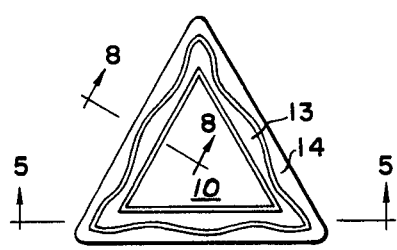
Fig. 1
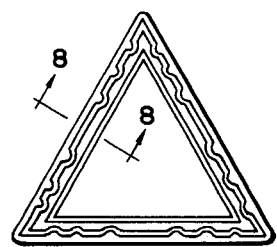
Fig. 2
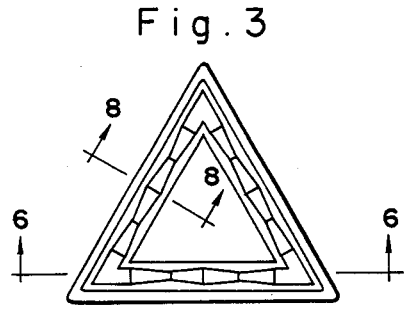
Fig. 3
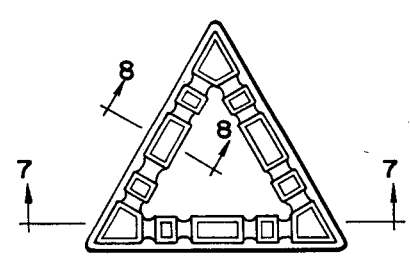
Fig. 4
Fig. 5
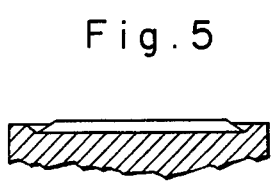
Fig. 6
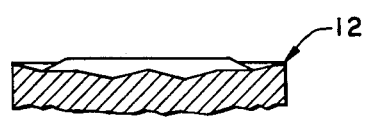
Fig. 7
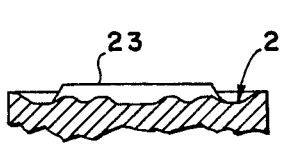
Fig. 8
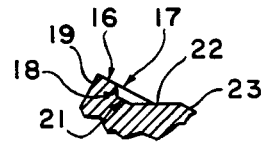

CUTTING TOOL INSERT WITH CHIP BREAKER

This is a continuation of co-pending application Ser. No. 550,903 filed on Nov. 10, 1983, now abandoned, which is a continuation of an applicaton Ser. No. 205,049 filed Nov. 7, 1980 which is currently abandoned.

BACKGROUND OF THE INVENTION

The present invention is concerned in general with interchangeable cutting tool inserts and more particularly with the chip breaker grooves in such interchangeable inserts.

Chip breaking grooves have been known and used in the tool machine art for many years to assure that the chips are broken before they become long enough to become entangled in the tools, to damage the workpiece or to harm the operators. A class of grooves essentially shape the chips to add rigidity and therefore are more susceptible to breaking. Some of the grooves form the chips into spirals and the spirals break of their own weight before becoming large enough to cause damage. Other grooves both rigidize the chips as they are formed and direct the chips toward obstacles, such as the body of the tool holder which breaks the rigidized chip, thereby, preventing the chip from causing damage.

Over the years, variations of chip breaking grooves have been used to improve the chip breaking quality of the cutting tool insert. There are various criteria to determine whether chip breaking is being expenditiously accomplished. Among these criteria are:

(1) the size and the shape of the chips generated during the cutting operation;
(2) the variation in feed rate that can be accomplished using the insert with the particular chip breaking groove;
(3) the variation in the depth of the cut that can be accomplished using the insert with the particular chip breaking groove;
(4) the power usage while using the insert with the particular chip breaking groove; and
(5) the longevity of the inserts with the particular chip breaking groove.

Accordingly, ideally chip breaking grooves must generate chips that break while short, and are effective over a wide range of feed rates and depths and with a minimum of power usage. At the same time the chip breaker groove must not significantly decrease the life of the insert. Thus, there is a constant attempt to provide cutting inserts with chip breaking grooves which enable, for example, the use of the inserts for a wide assortment of feed rates and cutting depths. At the same time the designers of the inserts have attempted to decrease the forces, such as cutting forces or friction forces exerted between the chip and the insert to both prolong the life of the insert and to minimize the power used in the actual formation and breaking of the chips.

For example, U.S. Pat. No. 3,187,406 provides an insert with a continuous chip control groove which has dual tandem radii with the back radius of the groove being greater than the forward radius. The chip controlling groove of the patent has a constant cross-sectional shape and is spaced equidistant from the cutting edges throughout its circumferential length. The patent points out how the dual radii enables the same insert to be used when the feed rate is classified as light, medium or heavy. Thus the patent teaches controlling the chip by using as the first radius for a thin chip the second radius for a thicker chip and the area behind the inward side of the second radius for controlling and stressing the heavy or thick chips. However, most of the chip shaping occurs far removed from the cutting edge and therefore an inordinate amount of power is required to shape the chip.

The prior art such as shown in U.S. Pat. Nos. 3,187,406, 3,383,748 and 3,399,442 use chip control grooves to increase the rigidity of the ribbon separated from the workpiece by curling it along the back wall of the groove or by using a curved cutting edge to create a metal strip hving an appropriate shaped profile such that when it undergoes forced bending by an obstacle in its flowpath, stresses are created in the ribbon which cause it to break. The added rigidity of the shaped profile enables the breaking of the chips even though the radii of curvature is relatively great as compared with the thickness of ribbon.

The radii of curvature of the prior art formed chips is mainly influenced by the geometry of the chip control groove. Therefore, grooves having fixed shapes can control only a limited range of radii of curvature in chips. The variations in the dimensions and configuration of the chip control grooves of the prior art have only extended the range of feed rate and cutting depth to a very limited degree. In addition it is well known that minimizing contacts between the cut ribbon and the surface of the cutting insert minimizes the power consumed during the cutting operation.

The range of feed rates and depths for a given insert with chip breaking grooves has been augmented in the past by also varying the shape of the cutting edge to shape the strip. Varying the shape of the cutting edge to shape the strip, as noted hereinbefore, has significant drawbacks among which are the cut marks left on the workpiece when the cutting edge is not a straight line.

The creation of a profile in the cross-section of the chip can be obtained by various cutting insert configurations such as, for example, the configurations described in U.S. Pat. No. 3,815,191 and U.S. Pat. No. 4,140,431. The characteristic feature of the inserts and more particularly the chip forming portions of the insert of prior patents is that the form of the cross-section of the chip is obtained by breaking the continuity of the cutting edge. U.S. Pat. No. 3,815,192 shows another approach for obtaining a profile in the cross-sectional shape of the chip. That approach is to create the profile as chip exits from the chip control groove. The disadvantage of that approach is that the deformation in the chip occurs in a region where the temperature of the chip is relatively low and accordingly much greater power has to be expended in deforming the chip.

Accordingly it is an object of the present invention to provide new and improved cutting inserts with chip control grooves in which the above referred to disadvantages are substantially reduced or overcome. According to the present invention a chip breaker arrangement is provided comprising polygonal cutting inserts having top and bottom surfaces spaced apart from each other, side surfaces joining and located between said top and bottom surfaces, a cutting edge forming a straight line at the junction of the side surfaces and said top and bottom surfaces, chip breaker means adjacent to said cutting edges in at least one of said top and bottom surfaces, said chip breaker means comprising groove means,
cutting edge land means separating said groove means from said cutting edges, and
said chip breaker means having a plurality of variations along said cutting edges.

BRIEF DESCRIPTION OF THE DRAWINGS

The invention will be better understood from the following specification taken in connection with the attached drawings, in which:

FIG. 1 is a plan view of one embodiment of the present invention showing an insert having chip control grooves where the width of the cutting edge land surfaces vary cyclically along the cutting edges;

FIG. 2 is a plan view of another embodiment of an insert with chip control grooves where the cutting edge land survaces vary non-cyclically along the cutting edges;

FIG. 3 is another embodiment of the present invention wherein the chip control grooves of an insert vary in ramp-like fashion from maximum to minimum widths and depth a plurality of times along the cutting edges;

FIG. 4 is a plan view of yet another embodiment of the present invention wherein the chip control grooves of a cutting tool insert vary sharply in both width and depth a plurality of times along said cutting edges;

FIG. 5 is a cross-sectional view taken along a plane 5—5 in FIG. 1 and looking in the direction of the arrows;

FIG. 6 is a cross-sectional view taken along a plane 6—6 in FIG. 3 and looking in the direction of the arrows;

FIG. 7 is another cross-sectional view taken along a plane 7—7 in FIG. 4 and looking in the direction of the arrows;

FIG. 8 is a cross-sectional view taken along the planes 8—8 in FIGS. 1–4 and looking in the direction of the arrows and FIG. 9 graphically shows the results of comparative tests A and B.

Figure 9:
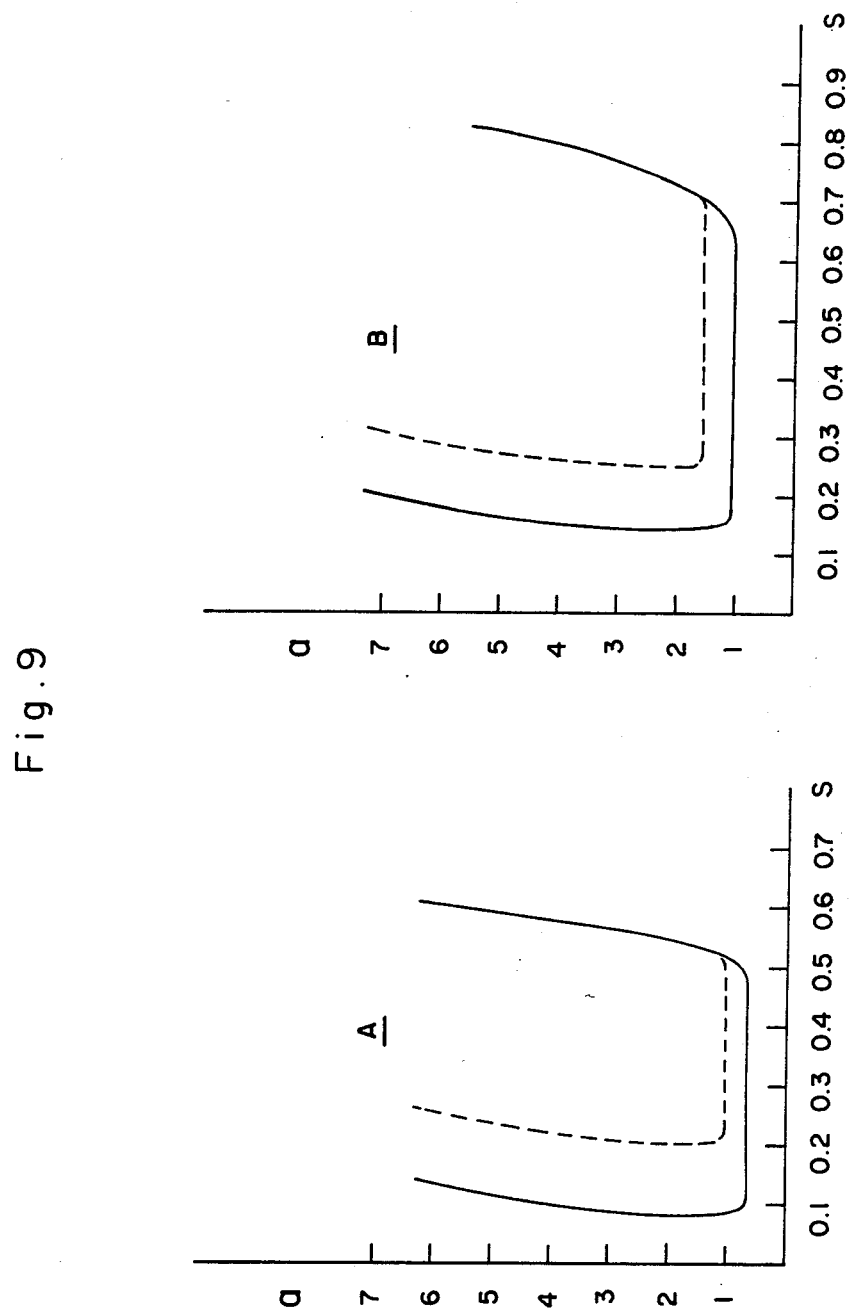

While each of the FIGS. 1–4 show a triangular shaped cutting insert, it should be understood that the invention relates to any polygonal insert. The cutting inserts have top surfaces such as surface 10 spaced apart from bottom surfaces (not shown) by side faces, such as side surface 19. A cutting edge 12 is formed at the juncture of the top and/or bottom surface and the side surfaces.

Chip control grooves such as chip control groove 13, in FIG. 1 for example, is formed on the top and/or bottom surfaces. In the embodiments shown in the drawings the edge of the groove 13 is spaced apart from the cutting edge 12 by a cutting edge land surface 16. The land surface 16 is particularly shown in FIG. 8. From the groove edge 17 a descending surface 18 is biased in a direction away from the peripheral side face and extends until it reaches a base 21. The base is shown extending substantially parallel to the land surface. From the base 21 an inclined surface 22 rises in the direction away from the cutting edge land surface 16 until it reaches the cutting insert island 23 of surface 10.

The embodiment of FIG. 1 causes the chip as cut to have a wavy profile, which imparts rigidity to the chip facilitating the breakage of even relatively thin chips. The wavy profile is caused by the variations in the width of the land cutting surface 16. The stresses introduced into the chip by the land cutting surface causes the chip to curl prior to reaching the back wall 22 of the groove. Thus all of the chip forming occurs while the chip is hot from the friction of the cutting operation and most malleable.

In the embodiment of FIG. 3 the profile of the chip is shaped to provide it with rigidity by the varying depth of the grooves in addition to the varying width of the grooves. The variations provided also cause even the thick chips to curl prior to striking the back wall 22.

In a preferred embodiment there are differences in the depth of the groove in the range of 50%. The distances between the peaks as noted in, for example, FIG. 6 is 2 to 3 mm.

The embodiment of FIG. 4 shapes the profile of the chips by the sharp variations in the depths and widths of the grooves. At the maximum height of the groove the sections or partitions reach the height of the cutting edge land surface.

The land surface is defined between a rectilinear (straight line) cutting edge and the groove edge where the latter is effectively constituted by a succession of substantially continuous linear portions (whether rectilinear or curved) so that there is defined between the cutting edge and each such groove edge portion a land surface region. Successive land surface regions are of respectively greater and lesser width.

As can be seen from the drawings, in the illustrated embodiments, each land surface includes at least five such successive regions. Thus, in the embodiment shown in FIG. 1 each land surface includes five land surface regions of successively lesser and greater widths, while in the embodiments shown in FIGS. 2 and 4, a substantially larger number of the land surface regions are included in each land surface.

An important feature and characteristics in all of the embodiments shown herein is that the cutting edge remains straight. Thus there are no problems of marring the workpiece as the workpiece is formed in a straight continuous manner; but the chips are shaped at the leading edge of the chip groove while the chip is still being cut and therefore only a minimum of power is required for the shaping of the chip. In practice, the chip is shaped and curled so that it does not touch the back wall of the groove.

A further important feature which is a characteristic of all the embodiments of the present invention is the groove which has such a shape that any normally directed section plane intersects the groove in three substantially rectilinear portions. This feature is clearly illustrated by FIG. 8 of the drawing.

Graphs of two comparative tests A and B demonstrate one of the advantages of the inventive inserts, i.e. the wide range of feed rates and cutting depths that is provided when using the inventive inserts. The graphs are included in FIGS. 9A and B.

The first graph A shows the results of tests using a cutting insert having a groove such as shown in the embodiment of FIG. 2. This insert was tested in comparison with a cutting insert having a straight chip control groove and a straight cutting edge. The graph shows the additional working range achieved in accordance with the invention. In the sample inventive insert used for the comparative tests the greatest width of the land surface was three times the smallest width. The length of the extensions of the land surfaces cover the range from 0.12 to 0.6 mm and the distance between the extensions of the land surfaces was 2 to 3 mm. On the accompanying graphs a is equal to the depths of cut in mm and s is equal to the feed rate in mm per revolution.

The second comparative test B used the embodiment of FIG. 3 and was also compared with a cutting insert having a normal groove, i.e. a straight groove and straight cutting edges. The sizes of the inserts in Tests A and B are different. The size used in Test B are for higher feed rates, and heavier cuts, for example. In the embodiment of FIG. 3 used in the test the differences in the depths of the grooves were 50% and the difference between the peaks were 2 to 3 mm. The graphs show the addition in the range of cutting depths and feed rates that result from the present invention. In both graphs, the tests results using the inventive inserts are shown by the solid line and the test results using the prior art inserts are shown by the dashed line.

An additional benefit is that when using the cutting inserts of the present invention, the power consumption is lowered significantly and the total wear on the insert drops significantly. Thus in use, chip control grooves, which vary a plurality of times along the cutting edges shape the profile of the chips, thereby both increasing the rigidity of the chips and curling the chips. The performance of the inventive cutting inserts is improved in that each cutting insert can be used over a wider range of feed rates and cutting depths, used less power and has a significantly increased longevity.

It should be understood that the scope of the present invention includes double grooves, the width of the cutting edge land area going to zero, cutting inserts with and without rake angles, horizontal cutting edges and angled cutting edges.

It is to be understood that this invention is susceptible to modification in order to adapt it to different usages and conditions and accordingly it is desired to comprehend such modifications within this invention as may fall within the scope of the appendant claims.

What we claim is:

1. A cutting tool insert having a chip breaker arrangement, the cutting tool insert being polygonally shaped having top and bottom surfaces spaced from each other, side surfaces joining the said top and bottom surfaces, cutting edges forming a substantially unbroken line at the junction of the said side surfaces and the said top and bottom surfaces, a chip breaker groove in at least one of the said top and bottom surfaces being shaped in such a manner that any normally directed section plane intersects the groove in three substantially rectilinear portions, the groove being separated from the cutting edges by cutting edge land surfaces and being positioned to shape the chip after cutting and without the further cutting thereof, said groove having an edge constituted by successive, substantially continuous, linear groove edge portions which respectively define between them and the cutting edge, successive land surface regions of successively increased and reduced widths, at least five such successive land surface regions being included in each land surface.

2. A cutting tool insert according to claim 1 wherein said land surface region widths vary continuously from region to region.

3. A cutting tool insert according to claim 1 wherein said land surface region widths vary discontinuously from region to region.

* * * * *